(12) United States Patent
Zbiral et al.

(10) Patent No.: US 12,062,808 B2
(45) Date of Patent: *Aug. 13, 2024

(54) DEGASSING UNIT, ELECTRONICS HOUSING, IN PARTICULAR BATTERY HOUSING, AND MOTOR VEHICLE

(71) Applicant: MANN+HUMMEL GmbH, Ludwigsburg (DE)

(72) Inventors: Robert Zbiral, Marbach (DE); Axel Liebendoerfer, Untergruppenbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 288 days.

This patent is subject to a terminal disclaimer.

(21) Appl. No.: 17/358,243

(22) Filed: Jun. 25, 2021

(65) Prior Publication Data
US 2021/0320376 A1 Oct. 14, 2021

Related U.S. Application Data

(63) Continuation of application No. PCT/EP2019/084339, filed on Dec. 10, 2019.

(30) Foreign Application Priority Data

Jan. 4, 2019 (DE) ..................... 10 2019 100 085.8

(51) Int. Cl.
*H01M 50/30* (2021.01)
*H01M 50/333* (2021.01)

(52) U.S. Cl.
CPC ....... *H01M 50/394* (2021.01); *H01M 50/333* (2021.01); *H01M 2220/20* (2013.01)

(58) Field of Classification Search
CPC . H01M 50/333; H01M 50/394; H01M 50/325
See application file for complete search history.

(56) References Cited

U.S. PATENT DOCUMENTS 5,660,944 A * 8/1997 Sprengel ............... H01M 50/30
429/93
10,366,845 B2 7/2019 Bellingkrodt et al.
(Continued)

FOREIGN PATENT DOCUMENTS

| CN | 101777244 A | 7/2010 |
| CN | 107278338 A | 10/2017 |
| JP | H05290897 A | 11/1993 |

*Primary Examiner* — Sadie White
*Assistant Examiner* — Kayla Elaine Clary

(57) ABSTRACT

A degassing unit for an electronics housing is provided with a base body to be connected fluid-tightly to a rim of a pressure compensation opening of the electronics housing. The base body has at least one gas passage opening. A semipermeable membrane covers, in a normal operating state of the degassing unit, the at least one gas passage opening of the base body. The semipermeable membrane enables passage of gaseous media from an environment into the electronics housing and in reverse, but prevents passage of liquid media and/or solids. The degassing unit can be transferred into an emergency degassing state by release of at least one emergency degassing opening bypassing the semipermeable membrane for providing an emergency degassing gas path. A first monitoring device is provided for detecting whether the degassing unit is in the normal operating state and/or in the emergency degassing state.

21 Claims, 4 Drawing Sheets

(56) References Cited

U.S. PATENT DOCUMENTS

| | | | | |
|---|---|---|---|---|
| 2001/0049051 | A1* | 12/2001 | Jones | H01M 10/121 |
| | | | | 429/57 |
| 2013/0032219 | A1 | 2/2013 | Heim et al. | |
| 2013/0034757 | A1* | 2/2013 | Doyle | H01M 50/35 |
| | | | | 429/89 |
| 2013/0098912 | A1* | 4/2013 | Scagliarini | B65D 25/20 |
| | | | | 220/89.1 |
| 2013/0280559 | A1* | 10/2013 | Guidal | H05K 1/0268 |
| | | | | 429/50 |
| 2016/0036025 | A1 | 2/2016 | Hofer | |
| 2019/0178401 | A1 | 6/2019 | Zaggl | |
| 2020/0086152 | A1* | 3/2020 | Stadler | H01M 50/30 |

* cited by examiner

DEGASSING UNIT, ELECTRONICS HOUSING, IN PARTICULAR BATTERY HOUSING, AND MOTOR VEHICLE

CROSS-REFERENCE TO RELATED APPLICATIONS

This application is a continuation application of international application No. PCT/EP2019/084339 having an international filing date of 10 Dec. 2019 and designating the United States, the international application claiming a priority date of 4 Jan. 2019 based on prior filed German patent application No. 10 2019 100 085.8, the entire contents of the aforesaid international application and the aforesaid German patent application being incorporated herein by reference.

BACKGROUND OF THE INVENTION

The invention concerns a degassing unit and an electronics housing, in particular a battery housing, in particular of a traction battery of a motor vehicle, and the motor vehicle itself.

Housings for receiving electronic components such as e.g. battery cells and the like cannot be closed completely gas-tightly relative to the environment because, on the one hand, due to temperature fluctuations (for example, by heat introductions by charging or discharging of battery cells) and, on the other hand, due to naturally occurring compressed air fluctuations, in particular in mobile systems, a gas exchange between interior and exterior space must be made possible in order to prevent impermissible mechanical loads of the housing, in particular bursting or bulging of the housing. It is however equally important that the penetration of foreign bodies, dirt, and moisture (in particular in form of liquid water) is effectively prevented because otherwise damages at the electrical system are imminent, in the worst case a short circuit fault.

Therefore, pressure compensation devices are known which comprise semipermeable membranes which are gas-permeable but liquid-impermeable.

When inside the housing a pressure peak occurs, for example, upon failure of a battery cell in a battery housing, this pressure must be released as quickly as possible because otherwise the housing might become damaged.

As a simplest configuration of a burst protection, for example, in case of lead batteries, it is known to employ burst disks in the meaning of a "rated break point", in particular of a metallic sheet metal material, or safety flaps or valves which are inserted into a housing opening.

In contrast thereto, in case of high-voltage batteries, in particular lithium-based traction batteries with significantly higher storage capacities and power densities, highly specific pressure compensation devices are used which are optimized for fulfilling the aforementioned objects.

DE 10 2012 022 346 B4 discloses a degassing unit for a battery housing that comprises a base body comprising a gas passage opening which is covered by a semipermeable membrane that is permeable for gases but impermeable for liquids, wherein the membrane is stationarily and fluid-tightly connected to the base body, in particular welded. The base body is fluid-tightly connectable to a pressure compensation opening of the battery housing. A gas exchange in normal operation is ensured by the membrane due to its semipermeable properties while, for realization of an emergency degassing function, an emergency degassing spike, pointing toward the membrane, is arranged at a cover body and causes perforation and rupture of the membrane upon surpassing a limit expansion induced by an interior housing pressure, so that a sudden pressure compensation from the interior to the environment is possible. At an interior side that is facing in the mounted state toward the battery housing, a protective lattice is connected to the base body which is to prevent an ingress of foreign bodies into the battery housing.

Moreover, DE 10 2011 080 325 A1 describes a similar degassing unit with a membrane that is stationarily held at a base body in which the emergency degassing function is also achieved by a targeted puncture of the membrane by means of a spike.

Furthermore, DE 10 2017 003 360 B3 discloses a degassing unit in which the functions emergency degassing and venting in the normal state are functionally separated. While venting in the normal state is realized by a nonwoven layer stationarily centrally secured at the base body, the emergency degassing is achieved by an umbrella valve that can lift off upon surpassing a limit pressure and opens a radially outwardly positioned annular gap of the base body for emergency degassing.

Degassing units according to the prior art, no matter whether they enable a reversible operation or not, have however the disadvantage that triggering (=transfer into the emergency degassing state) is not recognized by the user. In this operating state, no reliable protection against ingress of moisture and dirt can be ensured anymore and there is the threat of possibly overheating. When in such an operating state the technical system supplied by the battery continues to operate, there is the risk that irreversible damages are caused at the battery and possibly the risk of severe injuries, for example, in case of a fire.

SUMMARY OF THE INVENTION

It is therefore object of the present invention to provide a degassing unit for an electronics housing, in particular for a battery, in particular for a traction battery of a motor vehicle, that avoids the aforementioned disadvantages and enables a safe operation of the battery.

This object is solved by a degassing unit for an electronics housing, in particular for a battery, in particular for a traction battery of a motor vehicle, that comprises a base body which is fluid-tightly connectable to a rim of a pressure compensation opening of the electronics housing and comprises at least one gas passage opening that, in a normal operating state of the degassing unit, is covered by a semipermeable membrane that enables passage of gaseous media from an environment into the electronics housing and in reverse, but prevents passage of liquid media and/or solids, wherein the degassing unit can be transferred into an emergency degassing state, in which at least one emergency degassing opening bypassing the membrane is released for providing an emergency degassing gas path, the degassing unit characterized in that it comprises at least one monitoring device that is configured to detect whether the degassing unit is in the normal operating state and/or in the emergency degassing state.

This object is solved by an electronics housing, in particular battery housing, in particular of a traction battery of a motor vehicle, that comprises at least one housing wall with at least one pressure compensation opening, wherein in the electronics housing preferably battery cells can be arranged, wherein the pressure compensation opening is closed by a degassing unit, characterized in that the degassing unit is a degassing unit as claimed.

This object is solved by a motor vehicle, in particular road vehicle with an at least partially electric drive train, comprising an electronics housing embodied as a battery housing, characterized in that the battery housing is an electronics housing as claimed, wherein preferably the counter transmission element of the electronics housing is coupled operatively to at least one on-board vehicle control unit, and wherein an error message can be issued by means of the on-board vehicle control unit by means of an on-board issuing device of the vehicle preferably as a function of a detection value of the monitoring device of the degassing unit of the electronics housing that is received by the counter transmission element.

Preferred further embodiments of the invention are described in the dependent claims.

Advantages of the invention result from the description and the drawings. Also, the aforementioned and still to be explained features in accordance with the invention can be used individually by themselves or a plurality thereof combined in any combinations. The illustrated and described embodiments are not to be understood as a complete listing but have instead an exemplary character for the description of the invention.

According to a first embodiment of the invention, the degassing unit comprises a base body which is fluid-tightly connectable to a rim of a pressure compensation opening of the electronics housing and comprises at least one gas passage opening that, in a normal operating state of the degassing unit, is covered by a semipermeable membrane that enables passage of gaseous media from an environment into the electronics housing and in reverse, but prevents passage of liquid media and/or solids. The degassing unit can be transferred into an emergency degassing state in which at least one emergency degassing opening that bypasses the membrane is released. The degassing unit comprises moreover at least one monitoring device that is configured to detect whether the degassing unit is in the normal operating state and/or in the emergency degassing state. "Bypassing the membrane" is to be understood such that the emergency degassing opening in the emergency degassing state is flowed through parallel to the membrane.

The monitoring device can comprise in this context at least one sensor element that is configured to detect an operating state (normal or emergency degassing) of the degassing unit. The sensor element can be an electrical, capacitive, inductive or optical sensor. A detection value that is detected by the monitoring device can be processed appropriately by means of a suitable diagnostic device (e.g. vehicle control unit) and can serve for triggering a predetermined reaction, which may comprise, for example, indicating an error or even the immediate shutdown of the technical system. The diagnostic value of the monitoring device can be transmitted in particular in such a way to the vehicle control unit that it can be read out by means of conventional diagnostic interfaces and data transmission standards, e.g., OBD-II.

According to the present patent application, the term degassing unit has been selected for the device according to the invention. However, it is of course understood that the device according to the invention enables likewise venting of an interior of the electronics housing through the (porous) membrane in the normal operation.

The relative terms "interior" and "exterior" used herein relate to a mounted state in respect to the electronics housing wherein "interior" means pointing toward the electronics housing and "exterior" pointing toward the environment.

The degassing unit according to the invention can comprise a housing seal for ensuring an optimal sealing action at the interface base body-battery housing, in particular in the form of an O-ring which can be compressed in the mounted state axially in relation to a housing exterior wall or radially in the pressure compensation opening of the battery housing. However, the housing seal can also be a radial/axial-acting seal that is, for example, configured to seal in relation to at least one wall that is slanted at an angle relative to the longitudinal axis.

According to a preferred further embodiment, the monitoring device can be configured as an electrical monitoring device that comprises at least one electrical contact pair that is open in the emergency degassing state and is closed in the normal operating state, or is closed in the emergency degassing state and is open in the normal operating state.

Preferably, the membrane can be fluid-tightly fastened on a membrane carrier which is movable in relation to the base body and which, in the normal operating state, is pressed by an axial force seal-tightly against a seal that is circumferentially extending about a rim of the gas passage opening of the base body so that the membrane carrier, when a predetermined pressure difference between an interior of the electronics housing and an environment is surpassed, can be lifted off the base body with release of the at least one emergency degassing opening bypassing the membrane in order to transfer the degassing unit into the emergency degassing state. Herein, "movable" is to be understood as a translatory movement, in particular along the longitudinal axis, as well as a rotation wherein the membrane carrier then is embodied in particular essentially as a flap.

The base body and/or the membrane carrier can be comprised substantially of plastic material, in particular thermoplastic plastic material, and in particular injection molded. Preferred materials are polypropylene, polybutylene terephthalate or polyamide, each comprising reinforcement fibers, in particular glass fibers.

The membrane can be connected to the membrane carrier that is movable relative to the base body by gluing and/or welding, in particular by ultrasonic welding. In this way, an inexpensive manufacture as well as a sufficient seal-tightness can be achieved. Alternatively, the membrane can also be glued along a circumferentially extending sealing line to the membrane carrier.

Due to the construction in accordance with the invention with a membrane carrier that is movable relative to the base body and to which the semipermeable membrane is attached, a significantly more precisely determinable emergency degassing pressure results in comparison to the prior art. In the device according to the invention, the emergency degassing is not achieved by a perforation of the membrane and its rupture, but in that the membrane carrier, by action of a housing interior pressure, is lifted off the base body whereby at least one emergency degassing opening is released. The emergency degassing pressure is therefore neither determined by the tolerance-affected membrane thickness (especially due to the manufacturing process-related fluctuations) nor by the configuration of the distance of a spike from the membrane surface nor by temperature-dependent changes of the mechanical properties of the membrane material but solely by the influencing parameters, on the one hand, the employed membrane surface and, on the other hand, the contact force with which the membrane carrier is pressed against the base body for achieving the sealing effect. The membrane remains intact upon transfer of the degassing unit into the emergency degassing state and, after the emergency degassing pressure has been undershot again, can reversibly return together with the membrane carrier so that the degassing unit is ready for use again.

In order to enable, even after long periods of time without emergency degassing event, a fail-safe operation and in particular to prevent sticking of seals that participate in the sealing action of the membrane carrier in relation to the base body, particular focus is to be placed onto the selection of the sealing materials. In particular silicone rubber (VMQ), fluoro-rubber (FKM), ethylene propylene diene rubber (EPDM) have been found to be suitable sealing materials. In addition, for achieving a permanent seal-tight, non "sticking" connection it can be expedient to change the properties of the surface of the seal appropriately by a coating, in particular lacquer coating.

As a further advantage, the degassing unit according to the invention enables a flow cross section for emergency degassing that is as large as possible. After the membrane carrier has lifted off the gas passage opening of the base body, essentially the complete cross section of the gas passage opening is available also for emergency degassing. This is beneficial for a quick pressure release with a minimization of the expectable damages at the battery housing.

Finally, the emergency degassing pressure not only can be determined with a reduced fluctuation range, but it is also possible to achieve triggering at significantly smaller pressure differences than before, i.e., a very differentiated response behavior can be achieved.

The aforementioned advantages associated with the invention contribute to being able to provide electronics housings, in particular battery housings, which are provided with a degassing unit in accordance with the invention, with thinner walls, as needed, and thus in a material-saving way and thus less expensively.

For the semipermeable membrane all materials can be used that have a gas permeability for venting in the normal operation and a sufficiently high water impermeability. As a preferred material for the semipermeable membrane, polytetrafluoroethylene (PTFE) can be used. The semipermeable membrane comprises an average pore size that can lie between 0.01 micrometers and 20 micrometers. The porosity lies preferably at approximately 50%, the average pore size amounts preferably to approximately 10 micrometers.

The semipermeable membrane can be designed preferably as a film-type or film-shaped or disk-shaped thin membrane. The gas-permeable membrane comprises a membrane surface effective for gas permeation that can comprise preferably a rectangular or round outer contour at its outer circumference. It is however understood that the outer circumference of the membrane can also be designed differently. The membrane is preferably a thin flat membrane whose membrane surfaces that are effective for gas permeation and face away from each other are substantially parallel to each other and are preferably embodied substantially planar.

The membrane thickness of the membrane is very much smaller than its remaining outer dimensions. The membrane can span a minimum width and/or a minimum length or a minimum outer diameter of equal to or larger than 20 mm, preferably of equal to or larger than 30 mm, in particular of equal to or larger than 40 mm. The membrane thickness can be in particular at least 20 times, preferably at least 40 times, in particular at least 100 times, smaller than the minimum width and/or the minimum length and/or the minimum outer diameter of the membrane. The membrane thickness can amount to 1 micrometer to 5 millimeters, wherein a membrane thickness of 0.1 to 2 mm, in particular 0.15 to 0.5 mm, is preferred.

According to yet another embodiment, the electrical contact pair can comprise at least two electrical contact elements wherein at the base body a first contact element and at the membrane carrier a second contact element is arranged. In this way, lifting off of the membrane carrier that corresponds to transfer into the emergency degassing state can be unequivocally detected.

At the membrane carrier, at an inner side facing the base body, or at the base body, at an exterior side that is facing the membrane carrier, a seal which is circumferentially extending about the gas passage opening, preferably a lip seal, can be arranged which in the normal operating state seals the gas passage opening in relation to the membrane. In a particular embodiment, the seal can be injection molded to the membrane carrier or base body, for example, by a 2-component injection molding method. Alternatively, it can also be glued on.

Preferably, the lip seal comprises a sealing lip with an essentially linear sealing line which generates adherence effects as small as possible and does not stick even after a longer period of time. Preferably, the seal is held or fixed in a circumferentially extending seal receiving groove of the base body. Alternatively or additionally, the seal can also be glued to the base body or integrally formed thereon by a 2-component injection molding method. The seal receiving groove is preferably arranged at an exterior side of the base body that is facing the membrane carrier so as to circumferentially extend about the gas passage opening. On a side of the membrane carrier facing the base body, a sealing lip receiving groove can be provided which can be in particular conically embodied and which enables, due to the cone effect (effect of the conicity) an optimized sealing action by means of the sealing lip.

In yet a further preferred embodiment, the membrane can be connected circumferentially to the membrane carrier in a fluid-tight manner, in particular circumferentially welded, wherein the membrane is present preferably at an inner side of the membrane carrier which is facing the base body. A contact with or connection to the inner side of the membrane carrier has the advantage that the membrane upon inner pressure action is essentially held with form fit relative to the membrane carrier and the connection (welding, gluing or the like) is not loaded by tensile force; this is important in particular in case of use of PTFE materials that are already difficult to join. In order to prevent an impermissibly strong bending or "bulging" of the membrane also in case of inner pressure action which can lead to its destruction, the membrane carrier can comprise an outer protective lattice which spans across the membrane surface externally at least partially but is fluid-permeable with a sufficiently large surface proportion in order to enable gas exchange in the normal operation.

According to yet a further also preferred embodiment, the membrane carrier can be pressed by at least one spring element against the base body. The spring element can be preferably a pressure spring, in particular a spiral spring. The invention is however not limited thereto. Instead, also further spring elements are encompassed which are not mentioned explicitly here, such as plate springs and/or spring tongues. In embodiments of the invention with rotationally moveable membrane carrier, in particular rotary and/or leg springs are furthermore suitable.

By a suitable selection of the spring stiffness of the spring element, the degassing pressure can be adjusted very precisely and reproducibly. In addition, the triggering characteristics can be adapted further by the use of springs with tailored spring characteristic lines, wherein also progressive but in particular degressive spring characteristic lines are possible. By means of a degressive characteristic line, it is possible in this context to adjust a targeted sluggish response behavior while by means of a progressive characteristic line a faster response behavior can be realized.

According to an alternative embodiment, the membrane carrier can also be pressed by a magnet element, in particular a permanent magnet, against the base body.

Moreover, the degassing unit can comprise a cover hood which is connected to the base body, wherein the cover hood preferably comprises at least one venting opening. The cover hood ensures that the membrane cannot be damaged from the exterior either by foreign bodies, for example, pointed objects such as screwdrivers or the like, or by means of high-pressure cleaners and/or steam cleaners, and contributes thus effectively to a high IP protection class.

Preferably, it is provided in this context that the spring element with one end is supported at an inner surface of the cover hood that is facing the membrane carrier and with the other end at an outer surface of the membrane carrier that is facing the cover hood. The cover hood has preferably a spring guide or a spring plate at its inner side that is facing the membrane carrier which is designed to prevent an in particular radial displacement of the spring. The spring guide or the spring plate comprises for this purpose particularly preferred a sleeve section which extends axially and which, in case of a spiral spring as spring element, supports coaxially the spring. The membrane carrier can also comprise a spring guide or a spring plate which in a preferred manner is present at the exterior side of the membrane carrier that is facing the cover hood.

A further also preferred embodiment provides that a first electric contact element of the electrical contact pair of the monitoring device is present at the membrane carrier and a second electrical contact element at the cover hood. In this way, the monitoring device can be implemented in a simple way without problems, for example, as an electrical switch element which opens or closes a diagnostic circuit.

It can be structurally provided that the cover hood engages across the outer circumference of the base body at least partially in circumferential direction and preferably is fastened by means of a locking element engagement at the outer circumference of the base body. Herein, "engaging across" is associated with an axial overlap. By means of the connection of the cover hood with the base body, the spring force which is introduced according to some embodiments into the cover hood can be transmitted to the base body. For attachment of the cover hood at the base body, other fastening means are also conceivable however, for example, form-fit or friction-fit fastening means such as screws or undercuts.

In this context, according to yet another preferred embodiment, a further monitoring device can be used, in particular an electrical monitoring device that is configured to detect a connection of the cover hood with the base body, wherein preferably two electrical contact elements are provided, wherein at the base body a first contact element and at the cover hood a second contact element are arranged. The contact elements contact each other preferably in a mounted state of the cover hood wherein the contact is separated upon separation of the cover hood from the base body.

By means of the further monitoring device, in addition a loss or an incomplete attachment of the cover hood at the base body can be detected and can be transmitted for further processing to a vehicle control unit. This is also a safety-critical disturbance because without a cover hood or with an insufficiently fastened cover hood the protective function is significantly reduced, in particular regarding the ingress of splash water and/or foreign bodies.

A degassing unit with exclusively a second monitoring device represents an independent invention.

The latter could be described with the following features:

Degassing unit for an electronics housing, in particular for a battery, in particular for a traction battery of a motor vehicle, that comprises a base body that is fluid-tightly connectable to a rim of a pressure compensation opening of the electronics housing and comprises at least one gas passage opening that, in a normal operating state of the degassing unit, is covered by a semipermeable membrane which enables passage of gaseous media from an environment into the electronics housing and in reverse, but prevents passage of liquid media and/or solids, wherein the degassing unit can be transferred into an emergency degassing state in which at least one emergency degassing opening that bypasses the membrane is released, wherein the degassing unit comprises a cover hood which is connected to the base body. The degassing unit embodied in this way comprises a monitoring device, in particular an electrical monitoring device that is configured to detect a connection of the cover hood to the base body wherein preferably two electrical contact elements are provided and wherein at the base body a first contact element and at the cover hood a second contact element are arranged, wherein the contact elements preferably contact each other in a mounted state of the cover hood and the contact is separated upon separation of the cover hood from the base body, or in reverse.

Moreover, it can be provided that between the base body and the membrane carrier at least one linear guide is present that is configured to axially guide the membrane carrier upon transfer from the normal operating state into the emergency degassing state, and in reverse. This has the advantage that comparatively large strokes of the membrane carrier can be realized without there being the risk that it tilts. Large strokes have in turn the decisive advantage that a flow cross section as large as possible can be provide for emergency degassing.

The linear guide is preferably embodied as a combination of at least one corresponding pin and at least one bore, wherein preferably at least one bore is present at an exterior side of the base body that is facing the membrane carrier and a pin corresponding to the bore and guided in the bore is provided at the inner side of the membrane carrier facing the base body. The invention is however not limited to this but also encompasses inverted embodiments with pins at the base body and bores at the membrane carrier. The cross section shape of the bores and pins is not limited to circular cross sections but also encompasses any complementary shapes that are capable of providing a linear guiding action of the membrane carrier in relation to the base body, for example, a combination of a groove as a "bore" and a complementary blade as "pin"; in addition other, at least in sections, polygonal or elliptical cross section shapes are possible.

Here, it can be provided that a first electrical contact element of the electrical contact pair of the monitoring device is present at the pin and a second electrical contact element in or at the bore. Embedding of the contact elements can be realized in a configuration of the membrane carrier and/or of the base body of plastic material in a simple way and easily by processing in an insert injection molding process.

Moreover, it can be provided, which is also preferred, that the gas passage opening of the base body is covered, at least partially, by a fluid-permeable protective lattice, preferably covered across the entire surface. The protective lattice serves as ingress protection into an interior of the electronics housing so that objects, for example, screwdrivers or the like, cannot pass into the interior. This is in particular important because traction batteries of motor vehicles are operated frequently in the high-voltage range and this presents dangers. The protective lattice can comprise a plurality of spaced-apart lattice stays whose minimum distance is to be selected such that an ingress can be prevented safely. The lattice stays can be arranged in a rectangular pattern or as a combination of circumferentially extending and radially extending lattice stays.

The protective lattice can be designed in particular as one piece together with the base body or connected thereto as a separate component, in particular at an inner side of the base body which is facing the electronics housing in the mounted state of the degassing unit. The protective lattice can preferably comprise a metal or a plastic material or can be comprised thereof, preferably polypropylene and/or polybutylene terephthalate, each preferably comprising reinforcement fibers, in particular glass fibers. A protective lattice of metal has the advantage that even after a high temperature action (e.g. fire) the protective function is maintained. In a separate embodiment of the protective lattice, the latter can be, for example, screwed, riveted or connected by means of hot stamp to the base body.

As materials for the base body and/or the cover hood, plastic materials are conceivable, in particular thermoplastic plastic materials that can be processed by injection molding. Preferably, the base body and/or the cover hood is comprised of polypropylene, polybutylene terephthalate or polyamide, each comprising reinforcement fibers, in particular glass fibers, or at least comprises at least one of these materials.

Moreover, the base body can comprise at least one connecting device with which the degassing unit is connectable to the electronics housing, wherein the connecting device is preferably embodied as a bayonet connecting device or as thread connecting device. Particularly preferred, the bayonet connecting device projects axially away from an inner side of the base body which, in the mounted state, is facing the electronics housing. In an embodiment as a thread connecting device, the connecting device can be preferably formed by one or a plurality of thread bushing(s) (in particular thread insert in plastic material).

Alternatively or additionally, the degassing unit can comprise a housing seal which surrounds the gas passage opening of the base body at its inner side circumferentially. The housing seal can be embodied as an axial or radial seal, i.e., be present in particular at an end face (in case of the axial seal) or at a wall surface (in case of the radial seal). The housing seal can be embodied as an O-ring, which is received in a corresponding groove of the base body, or as a seal component attached by injection molding. An arrangement of the housing seal in axial configuration is preferred wherein, particularly preferred, the housing seal surrounds a bayonet connecting device which in particular projects away axially.

Finally, according to a further preferred embodiment, at the base body, in particular at an inner side of the base body which is facing in the mounted state the electronics housing, at least one electrical transmission element can be provided that is coupled operatively to the monitoring device and by means of which at least one detection value of the monitoring device can be transmitted. The electrical transmission element serves thus for leading out the detection value detected by the monitoring device to a downstream device component so that the information whether the degassing unit is in the normal operating state or in the emergency degassing state can be made available for further processing.

A further aspect of the invention concerns an electronics housing, in particular a battery housing, in particular of a traction battery of a motor vehicle. As further possibilities of use of the degassing unit according to the invention, aside from traction batteries, for example, switch cabinets or transformer housings are conceivable. The electronics housing has at least one housing wall with a pressure compensation opening, wherein in the electronics housing preferably battery cells can be arranged and wherein the pressure compensation opening is closed by a degassing unit according to the invention so that in a normal operating state a gas exchange between an interior of the electronics housing and the environment is possible but penetration of moisture, dirt, and foreign bodies is effectively prevented, and a quickly triggerable emergency degassing function is provided which in case of a pressure increase in the interior prevents damage or destruction of the wall of the electronics housing.

According to a further embodiment, at least one counter connecting device corresponding to the bayonet connecting device of the degassing unit can be present at the housing wall in a region surrounding the pressure compensation opening.

Finally, the housing wall can comprise at an exterior side a sealing surface which is circumferentially extending about the pressure compensation opening at which the housing seal of the degassing unit is resting in a mounted state. The sealing surface is preferably embodied as a region of the wall of the electronics housing with deviations as small as possible with regard to flatness and with minimal roughness. Suitably, the electronics housing or at least its wall comprises a metal material or is comprised thereof so that the sealing surface can be obtained simply by mechanical machining with respect to the aforementioned properties.

According to a particularly preferred embodiment of the electronics housing, at the housing wall an electrical counter transmission element can be present that is operatively coupled to the transmission element of the degassing unit. The counter transmission element can be designed, for example, as at least one electrical contact device which in particular by means of an on-board vehicle wiring harness can be connected to at least one vehicle control unit for further processing of the detection value.

A last aspect of the invention concerns a motor vehicle, in particular road vehicle, with at least one partially electric drive train that comprises an electronics housing designed as a battery housing. The battery housing is an electronics housing according to the invention wherein preferably the counter transmission element of the electronics housing is operatively coupled with at least one on-board vehicle control unit. Further preferred, as a function of a detection value of the monitoring device of the degassing unit of the electronics housing that is received by the counter transmission element, an error message can be issued by means of an on-board vehicle indicator device. Advantageously, the vehicle control unit can be designed such that it comprises an error memory and/or can be read out by an in particular standardized diagnostic protocol, e.g. OBD-II. A transfer of the degassing unit of the battery housing into an emergency degassing state therefore no longer remains undetected in the vehicle according to the invention but can be indicated to the driver and/or can be made available for read-out in the error memory as an important service information.

DESCRIPTION OF PREFERRED EMBODIMENTS

Figure 1:
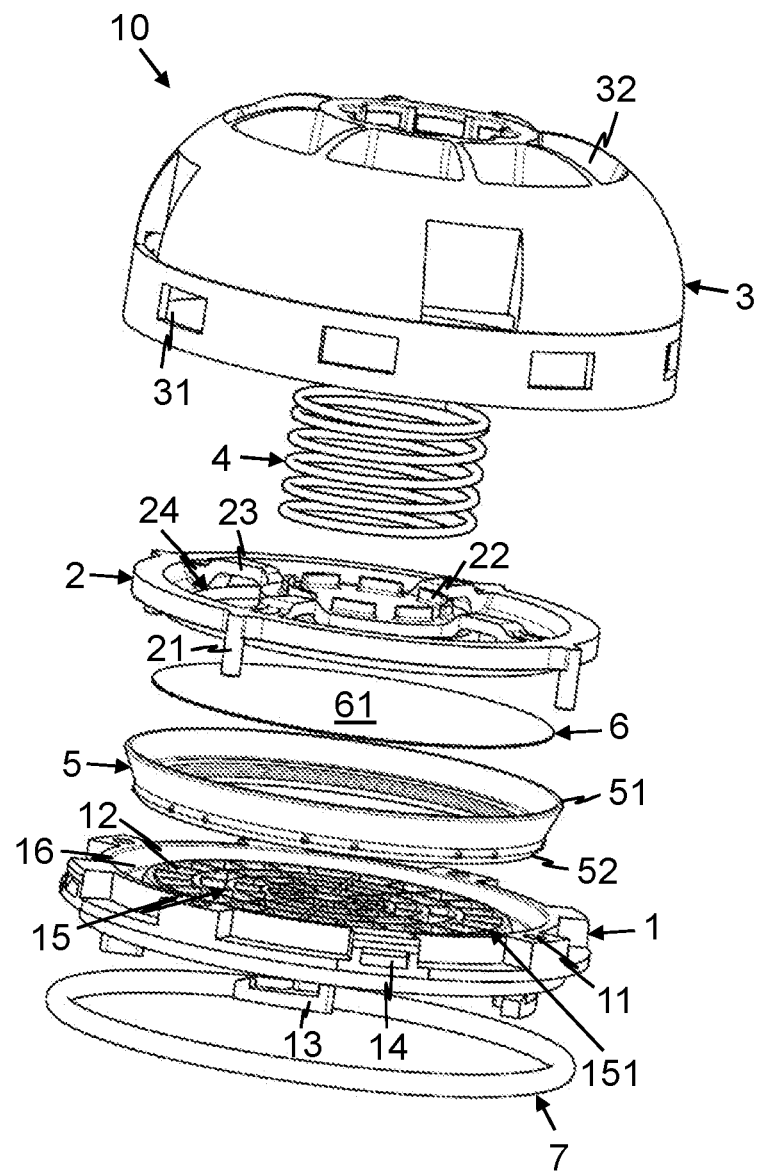
FIG. 1 shows an isometric exploded view of a degassing unit according to the invention.

In FIG. 1, the degassing unit 10 according to the invention is shown in an isometric exploded illustration. It comprises a base body 1 which is connectable by bayonet connecting device 13, which project axially away from an inner end face of the base body 1, to the rim of a pressure compensation opening of an electronics housing, in particular of a battery housing of a traction battery. For fluid-tight sealing of the base body 1 in relation to the wall of the electronics housing, a housing seal 7 is provided which is embodied here as an axially acting O-ring. The base body has a gas passage opening 15 through which a pressure compensation in the normal operating state is realized as well as, in an emergency degassing state, pressure can escape from the battery housing. The gas passage opening 15 is covered by a fluid-permeable protective lattice 12 which provides an ingress protection and prevents that voltage-conducting components in the interior of the electronics housing are touched and/or damaged by pointed objects. The protective lattice 12 has a plurality of lattice stays which are arranged circumferentially as well as in radial direction and form a net of lattice stays. In the present embodiment, the protective lattice 12 is formed as one piece together with the base body 1, in particular injection molded as one piece.

Furthermore, the degassing unit 10 comprises a membrane carrier 2, which in axial direction can be displaced relative to the base body 1, i.e., it comprises a degree of freedom of movement in axial direction. The membrane carrier 2 carries at its inner side facing the base body 1 a semipermeable membrane 6 which is permeable for gaseous fluids but prevents the passage of solids and liquids. The semipermeable membrane 6 is fluid-tightly connected to the membrane carrier 2 around the gas passage opening 24 of the membrane carrier 2, preferably welded or glued. In the normal operating state of the degassing unit 10, the membrane carrier 2 is axially compressed by a spring element 4, here a spiral spring, in a direction oriented toward the base body 1 so that a circumferentially extending seal 5 provided in axial direction between the membrane carrier 2 and the base body 1 seals the membrane carrier 2 in relation to the base body 1. In the normal operating state in which a gas exchange between interior of the electronics housing and the environment takes place (due to air pressure fluctuations and/or temperature changes), it is therefore exclusively the membrane surface 61 that is available for flow.

According to an embodiment which is not illustrated, the membrane carrier 2 can also be pivotably supported in relation to the base body 1 so that alternatively it can have at least one rotatory degree of freedom.

When the inner pressure in the electronics housing increases, the pressure force which is acting on the membrane surface 61 increases by the same amount so that, beginning at a certain limit pressure, the pressure force which is acting on the membrane surface 61 and the spring force axially pressing the membrane carrier 2 into contact will cancel each other so that upon further inner pressure increase the membrane carrier 2 together with membrane 6 is lifted axially off the base body 1 and releases at least one emergency degassing opening bypassing the membrane 6. This state is referred to as emergency degassing state and is illustrated in more detail in FIG. 3. Reasons for a strong inner pressure increase can be a sudden temperature increase and/or sudden gas development in the electronics housing, which can happen in particular in case of traction batteries because cell defects cannot be completely excluded.

The spiral spring 4 which exerts the contact force on the membrane carrier 2 is supported with one end at the inner side of the cover hood 3 and with the other end at an exterior side of the membrane carrier 2 facing the cover hood 3. The cover hood 3 is connected to the base body 1 for dissipating the spring forces; it circumferentially engages with a circumferential rim the base body 1 radially outwardly and is connected with the latter with form fit by locking element engagements. The locking element engagement is realized by the combination of corresponding locking hooks 14 at a wall surface of the base body 1 and locking openings 31 in a wall surface of the cover hood 3. The cover hood 3 has a plurality of circumferentially distributed venting openings 32 through which gases can flow into and out of the electronics housing in the normal operating state as well as in the emergency degassing state.

In order for the spiral spring 4 to be safely held in radial direction in the normal operating state as well as in the emergency degassing state, at the outer surface of the membrane carrier 2 that is facing the cover hood 3 a spring guide 22 is provided which is comprised of a plurality of circumferentially distributed elevations with axial extension which are surrounded by the spiral spring 4. In other embodiments, the spiral spring can also be present within the spring guide 22 and/or the spring guide can be embodied as a continuous sleeve-shaped projection. The spring guide 22 is connected by radially extending connecting elements, here stop bridges 23, to an outer circumference of the membrane carrier 2 wherein the gas passage opening(s) 24 of the membrane carrier 2 is (are) formed in a ring gap between outer circumference and spring guide 22.

For limiting the stroke of the membrane carrier 2 between the normal operating state and the emergency degassing state, the stop bridges 23 are embodied to project in axial direction in the direction toward the cover hood so that for maximum opening (=maximum stroke of the membrane carrier) they contact respectively corresponding counter stop surfaces on an inner side of the cover hood 3 facing the membrane carrier 2.

The seal 5, present between membrane carrier 2 and base body 1, comprises two regions, a fastening region 52 with which it is received in the circumferentially extending seal receiving groove 16 of the base body 1, and a sealing lip 51 with a reduced material thickness in comparison to the fastening region 52. The fastening region 52 and the sealing lip 51 are each embodied to extend circumferentially so that the seal forms an annular seal. The fastening region 52 of the seal 5 is received in a seal receiving groove 16 of the base body 1 which surrounds in radial direction outwardly the gas passage opening 15. The sealing lip 51 is positioned at an end of the seal 5 which is facing away axially from the fastening region 52 and is embodied to seal-tightly rest in the normal operating state at a sealing counter surface at a side of the membrane carrier 2 facing the base body 1. In this respect, reference is being had to FIG. 2 in which this can be seen well. At the sealing counter surface, the membrane carrier 2 has a sealing lip receiving groove 25 which is provided with a circumferentially extending guide surface that is slanted relative to the longitudinal axis and is radially inwardly positioned; this guide surface guides and centers the sealing lip 51 of the seal 5 upon return of the degassing unit 10 from the emergency degassing state into the normal operating state.

As has been described herein already, one of the advantages of the present invention is the large flow cross section of the emergency degassing opening(s) in the emergency degassing state which is achieved by a large stroke of the membrane carrier 2 relative to the base body 1. In order for the membrane carrier 2 not to tilt and/or be displaced impermissibly in radial direction even at maximum stroke, a linear guide is provided which is formed by bores 11 and pins 21 which correspond with each other. The pins 21 are present at the membrane carrier 2 and extend in axial direction freely inwardly toward the base body 1. The pins 21 are guided each in bores 11 of the base body 1 which are open outwardly in axial direction toward the membrane carrier 2. The length of the pins 21 in regard to the maximum stroke is dimensioned such that even for maximum stroke they are still guided with a predetermined minimum length in the bores 11. The linear guides ensure also that the sealing lip 51 of the seal 5 is always contacting the counter sealing surface provided for it in the sealing lip receiving groove 25 of the membrane carrier and is not radially displaced which could lead to leakages in operation. In this way, it is thus ensured that the degassing unit 10 after completed transfer into the emergency degassing state can return without problem into the normal operating state, i.e., the reversible functionality is enabled decisively by the linear guide.

Figure 2:
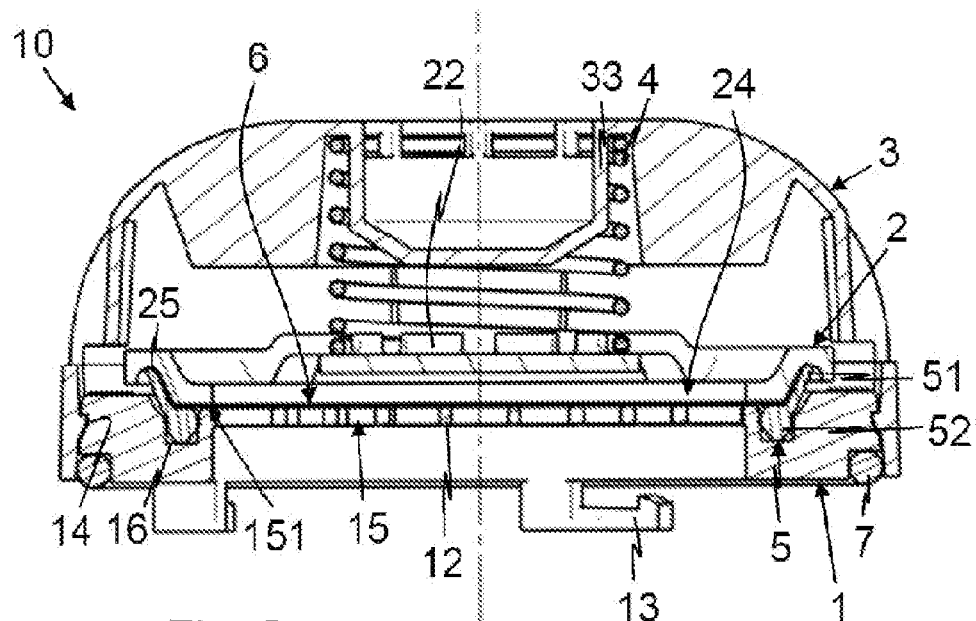
FIG. 2 shows a longitudinal section view of the degassing unit according to the invention in the normal operating state.

In FIG. 2, the degassing unit 10 is illustrated in a longitudinal section in the normal operating state. The membrane carrier 2 is pressed axially by the pressure spring 4 supported at the cover hood 3 with intermediate positioning of the seal 5 against the base body 1. The sole gas exchange is realized through the membrane 6 which can be flowed through serially relative to the gas passage opening 15 of the base body and the gas passage opening 24 of the membrane carrier 2. Also, the locking element engagement for attachment of the cover hood 3 at the base body can be seen well, wherein the locking hooks 14 provided at the base body 1 are designed as radial projections. The pressure spring 4 is also guided, on the part of the cover hood 3, radially by a spring guide 33 which is embodied as a securing sleeve 33 which is projecting coaxially into the pressure spring 4. In the normal operating state, the membrane 6, which is circumferentially welded so as to surround the gas passage opening 24 to an inner side of the membrane carrier 2, is contacting the protective lattice 12 of the base body 1.

Figure 3:
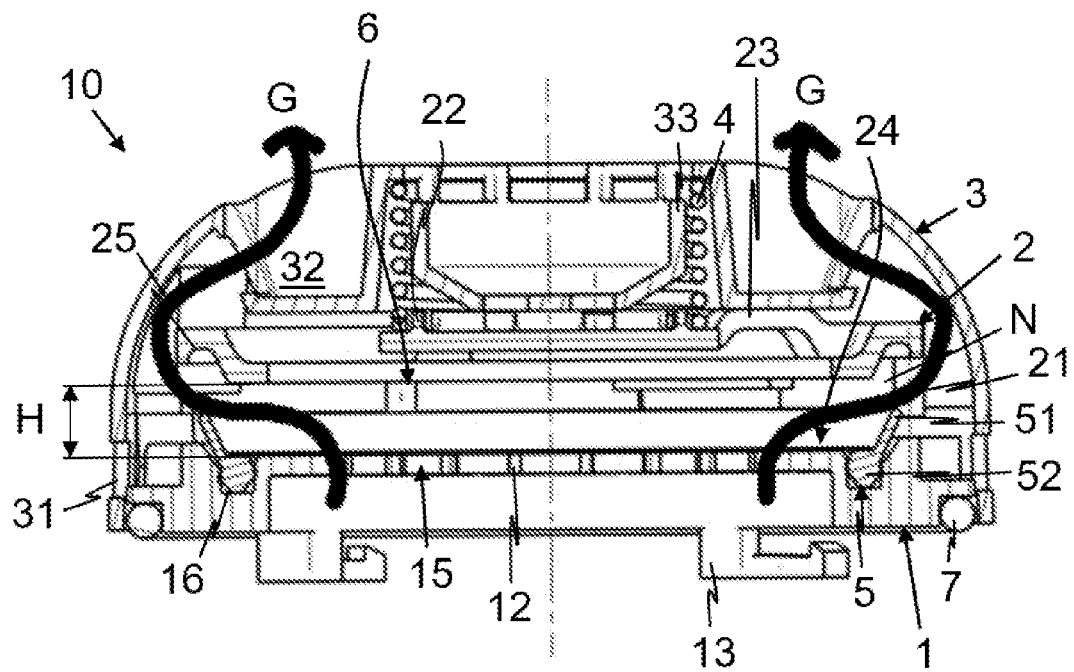
FIG. 3 shows a longitudinal section view of the degassing unit according to the invention in the emergency degassing state.

When the degassing unit 10 is transferred by the above-described increase of the inner pressure in the electronics housing into the emergency degassing state, the membrane carrier under the effect of this pressure is displaced axially in the direction of the cover hood (outwardly); this state is illustrated in FIG. 3. The maximum stroke H of the membrane carrier 2 relative to the base body is identified at H so that a circumferentially extending emergency degassing opening N is released which makes it possible that the housing interior pressure can pass along the emergency degassing path G into the environment. The flow cross section of the emergency degassing opening N is determined by the axial gap between the sealing lip 51 and the corresponding counter sealing surface in the sealing lip receiving groove 25 of the membrane carrier 2. The emergency degassing path G extends from the emergency degassing opening N along the inner contour of the cover hood 3 and finally through the venting openings 32.

When the housing inner pressure drops again below a predetermined closure pressure, i.e., the spring force surpasses again the pressure force on the membrane surface 61, the membrane carrier 2 is returned axially again (hysteresis) and is supported in this context by the linear guide so that the sealing lip 51 can contact exactly centered the counter sealing surface in the sealing lip receiving groove 25 with a sealing contact.

Figure 4:
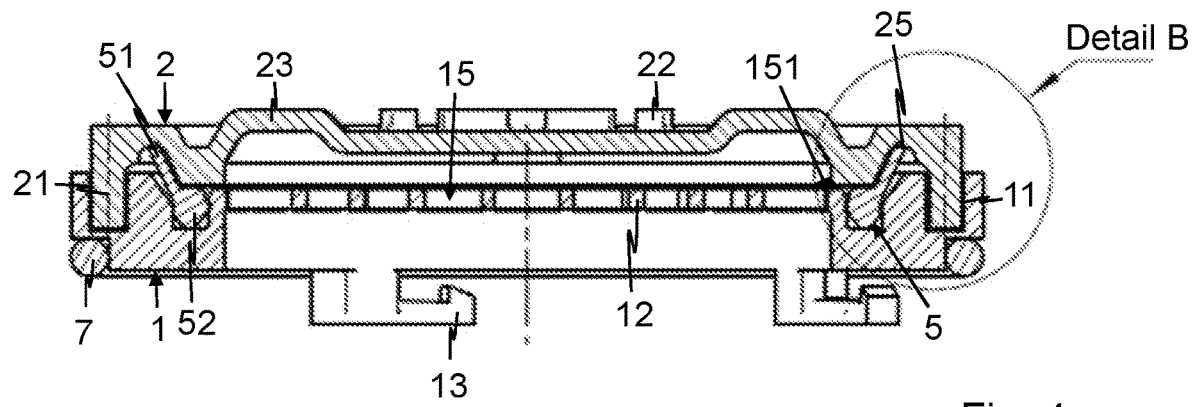
FIG. 4 shows a longitudinal section view of the degassing unit according to the invention in the normal operating state with removed cover hood.
Figure 5:
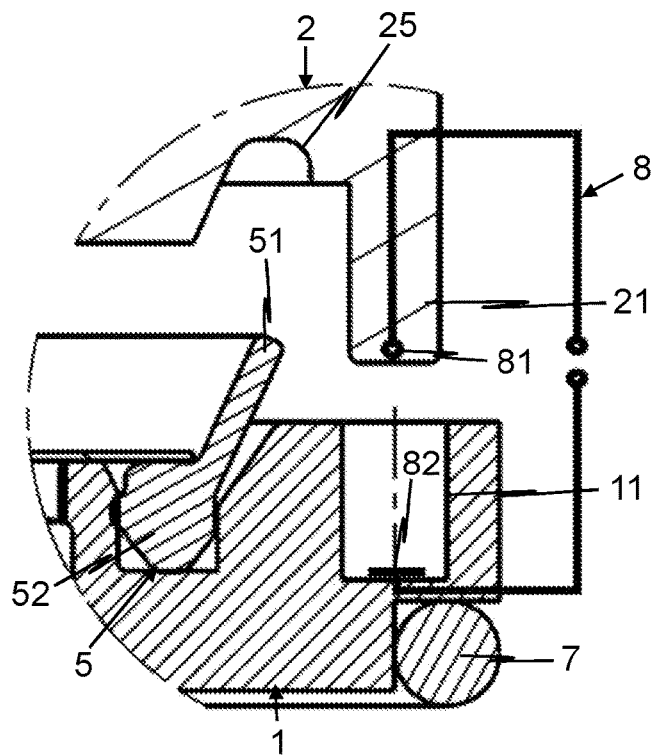
FIG. 5 shows detail B of FIG. 4.

This sealing contact is illustrated in detail in FIGS. 4 and 5 wherein the cover hood 3 and the pressure spring 4 are not shown for simplifying the representation. FIG. 5 shows detail B of FIG. 4.

In the detail view of FIG. 5, the gist of the invention, the monitoring device 8, can now be seen clearly. The monitoring device 8 comprises an electrical contact pair with two contact elements 81, 82, by means of which a diagnostic circuit can be closed or opened. A first contact element 82 is provided at the base of the bore 11 and a second contact element 81 at the end face of the pin 21. When the degassing unit 10 is in its normal operating state, the first and second contact elements 81, 82 contact each other and the diagnostic circuit is closed. When now the degassing unit 10 by the afore described lifting of the membrane carrier 2 is transferred into the emergency degassing state, the pin 21 lifts off the base of the bore 11 so that the diagnostic circuit is interrupted; this interruption can be made available as a diagnostic value of the monitoring device 8 in a way so as to be further processible by a downstream technical system.

Figure 6:
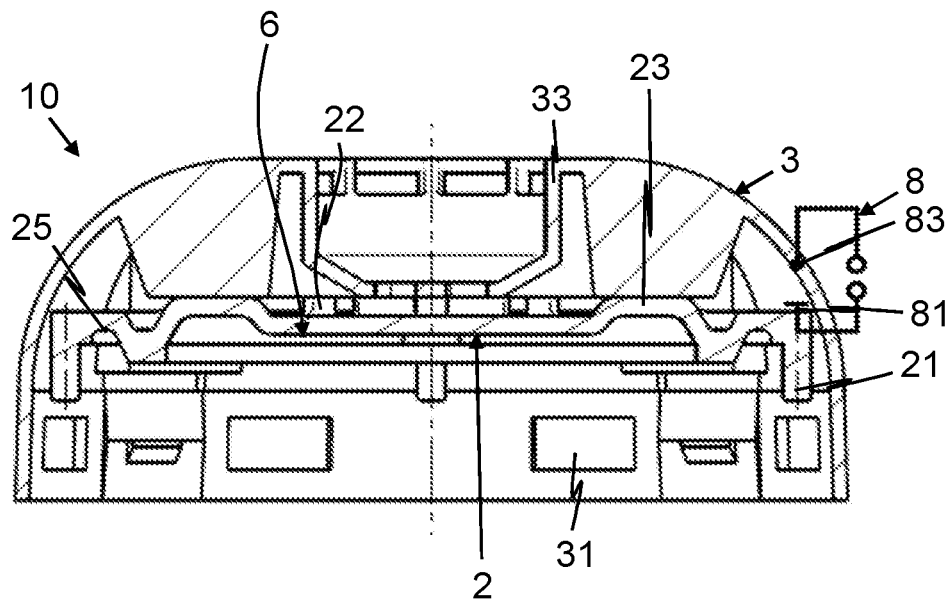
FIG. 6 shows a longitudinal section view of a further embodiment of the degassing unit according to the invention.

An alternative possibility for detecting the operating state of the degassing unit 10 is illustrated in FIG. 6. Here, lifting of the membrane carrier 2 can also be detected by corresponding contact elements 81, 83. A first electrical contact element 81 of the electrical contact pair of the monitoring device is positioned in this context at the membrane carrier 2 and a second electrical contact element 83 at the cover hood 3. The base body 1 according to this embodiment does not participate in the detection which has advantages because the base body 1 can be kept free of electrical current and therefore in particular can be manufactured completely of an insulating material.

Figure 7:
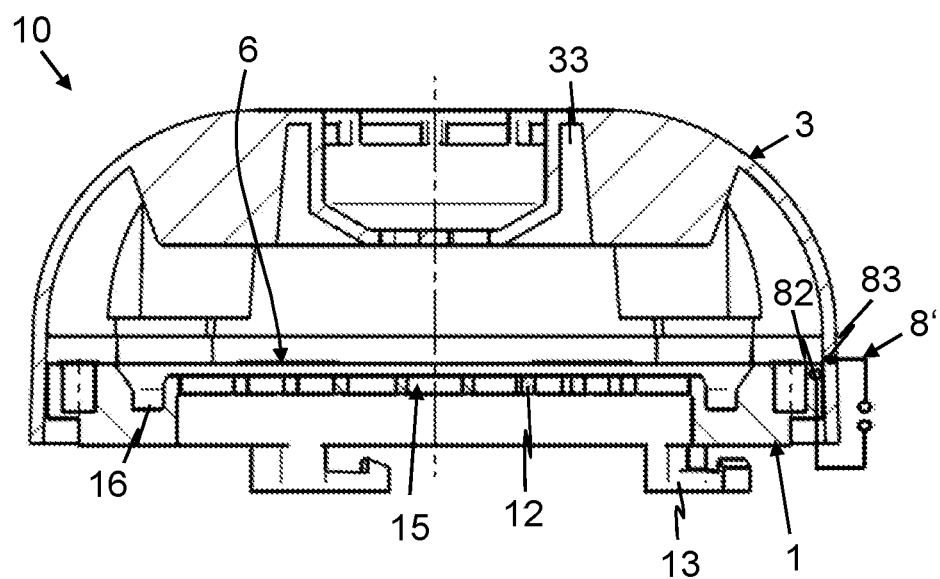
FIG. 7 shows a longitudinal section view of yet another embodiment of the degassing unit according to the invention.

According to FIG. 7, an alternative or additional further monitoring device 8' is illustrated that is configured to detect a connection of the cover hood 3 to the base body 1. Two electrical contact elements 82, 83 are provided, a first contact element 82 at the base body 1 and a second contact element 83 at the cover hood 3. The contact elements 82, 83 contact each other in a mounted state of the cover hood 3 wherein the contact is separated upon separation of the cover hood 3 from the base body 1. In this way, it can be detected whether the cover hood 3 is properly attached to the base body 1 which is a safety-relevant feature.

LIST OF REFERENCE CHARACTERS 10 degassing unit
1 base body
11 guide bores
12 protective lattice
13 bayonet connecting device 14 locking hook
15 gas passage opening
151 rim of the gas passage opening
16 seal receiving groove of the base body
2 membrane carrier
21 guide pin
22 spring guide
23 stop bridge
24 gas passage opening of the membrane carrier
25 sealing lip receiving groove of the membrane carrier
3 cover hood
31 locking openings
32 venting opening
33 spring guide
4 spring element/spiral spring
5 seal/lip seal
51 sealing lip
52 fastening region of the seal
6 semipermeable membrane
61 outer membrane surface
7 housing seal
8 monitoring device
8' further monitoring device
81, 82, 83 electrical contact elements
G gas flow for emergency degassing
H maximum stroke of membrane carrier relative to base body
N emergency degassing opening/flow cross section

What is claimed is:

1. A degassing unit for an electronics housing, the degassing unit comprising:
a base body configured to be connected fluid-tightly to a rim of a pressure compensation opening of the electronics housing, wherein the base body comprises at least one gas passage opening;
a membrane carrier;
a semipermeable membrane fastened fluid-tightly to the membrane carrier, wherein the semipermeable membrane is configured to, in a normal operating state of the degassing unit:
cover the at least one gas passage opening of the base body;
enable passage of gaseous media from an environment into the electronics housing and in reverse from the electronics housing into the environment; and
prevent passage of liquid media and/or solids;
an axial seal circumferentially extending about a rim of the at least one gas passage opening of the base body, wherein the membrane carrier is configured to:
in the normal operating state, pressed by an axial force seal-tightly against the axial seal; and
when a pressure difference between an interior of the electronics housing and an environment is surpassed, lift off the base body, and release at least one emergency degassing opening surrounding the semipermeable membrane and transfer the degassing unit into an emergency degassing state;
a cover hood connected to the base body, wherein the cover hood comprises at least one venting opening; and
a monitoring device comprising a first contact element arranged at the membrane carrier, and a second contact element arranged at the cover hood, the monitoring device being configured to:
detect that the degassing unit is in the normal operating state when the first contact element is not in contact with the second contact element; and
detect that the degassing unit is in the emergency degassing state when the first contact element contacts the second contact element.

2. The degassing unit according to claim 1, wherein the semipermeable membrane is connected fluid-tightly circumferentially to the membrane carrier, and
the semipermeable membrane is arranged at an inner side of the membrane carrier, the inner side facing the base body.

3. The degassing unit according to claim 1, wherein the axial seal is arranged at an inner side of the membrane carrier, the inner side facing the base body, or is arranged at an exterior side of the base body, the exterior side facing the membrane carrier, and
the axial seal is configured to, in the normal operating state, seal the at least one gas passage opening of the base body in relation to the semipermeable membrane.

4. The degassing unit according to claim 1, further comprising at least one spring element configured to press the membrane carrier against the base body.

5. The degassing unit according to claim 4, wherein the at least one spring element comprises a first end and a second end opposite the first end,
the cover hood comprises an inner surface facing the membrane carrier,
the membrane carrier comprises an outer surface facing the cover hood,
the first end is supported at the inner surface of the cover hood, and
the second end is supported at the outer surface of the membrane carrier.

6. The degassing unit according to claim 1, further comprising one or more pins arranged at the membrane carrier, wherein the one or more pins are configured to axially guide the membrane carrier when the degassing unit is transferred from the normal operating state into the emergency degassing state and transferred from the emergency degassing state into the normal operating state.

7. The degassing unit according to claim 6, further comprising one or more bores configured to respectively guide the one or more pins.

8. The degassing unit according to claim 7, wherein the one or more bores are arranged at an exterior side of the base body, the exterior side facing the membrane carrier, and
the one or more pins are arranged at an inner side of the membrane carrier, the inner side facing the base body.

9. The degassing unit according to claim 1, wherein the base body comprises a bayonet or a thread configured to connect the degassing unit to the electronics housing.

10. The degassing unit according to claim 9, further comprising a housing seal surrounding circumferentially the at least one gas passage opening of the base body at an inner side of the base body that is facing the electronics housing in a mounted state of the degassing unit.

11. The degassing unit according to claim 9, wherein the bayonet axially projects away from an inner side of the base body.

12. The degassing unit according to claim 1, further comprising a housing seal surrounding circumferentially the at least one gas passage opening of the base body at an inner side of the base body that is facing the electronics housing in a mounted state of the degassing unit.

13. The degassing unit according to claim 12, wherein the base body comprises a bayonet or a thread configured to connect the degassing unit to the electronics housing.

14. The degassing unit according to claim 13, wherein the bayonet axially projects away from the inner side of the base body.

15. The degassing unit according to claim 1, further comprising at least one electrical transmission element arranged at the base body and operatively coupled to the monitoring device, wherein the at least one electrical transmission element is configured to transmit at least one detection value of the monitoring device.

16. The degassing unit according to claim 15, wherein the at least one electrical transmission element is arranged at an inner side of the base body that is facing the electronics housing in a mounted state of the degassing unit.

17. An electronics housing comprising:
at least one housing wall comprising at least one pressure compensation opening; and
a degassing unit arranged in a mounted state in the pressure compensation opening and configured to close the pressure compensation opening, wherein the degassing unit comprises:
  a base body connected fluid-tightly to a rim of the at least one pressure compensation opening, wherein the base body comprises at least one gas passage opening;
  a membrane carrier;
  a semipermeable membrane fastened fluid-tightly to the membrane carrier, wherein the semipermeable membrane is configured to, in a normal operating state of the degassing unit:
    cover the at least one gas passage opening of the base body;
    enable passage of gaseous media from an environment into the electronics housing and in reverse from the electronics housing into the environment; and
    prevent passage of liquid media and/or solids;
  an axial seal circumferentially extending about a rim of the at least one gas passage opening of the base body, wherein the membrane carrier is configured to:
    in the normal operating state, be pressed by an axial force seal-tightly against the axial seal; and
    when a pressure difference between an interior of the electronics housing and an environment is surpassed, lift off the base body, and release at least one emergency degassing opening surrounding the semipermeable membrane and transfer the degassing unit into an emergency degassing state;
  a cover hood connected to the base body, wherein the cover hood comprises at least one venting opening; and
  a monitoring device comprising a first contact element arranged at the membrane carrier, and a second contact element arranged at the cover hood, the monitoring device being configured to:
    detect that the degassing unit is in the normal operating state when the first contact element is not in contact with the second contact element; and
    detect that the degassing unit is in the emergency degassing state when the first contact element contacts the second contact element.

18. The electronics housing according to claim 17, further comprising an electrical counter transmission element arranged at the at least one housing wall and operatively coupled to a transmission element of the degassing unit.

19. A motor vehicle comprising:
an at least partially electric drive train;
an electronics housing comprising at least one housing wall comprising at least one pressure compensation opening, wherein the electronics housing is a battery housing; and
a degassing unit arranged in a mounted state in the pressure compensation opening and configured to close the pressure compensation opening, wherein the degassing unit comprises:
  a base body connected fluid-tightly to a rim of the at least one pressure compensation opening, wherein the base body comprises at least one gas passage opening;
  a membrane carrier;
  a semipermeable membrane fastened fluid-tightly to the membrane carrier, wherein the semipermeable membrane is configured to, in a normal operating state of the degassing unit:
    cover the at least one gas passage opening of the base body;
    enable passage of gaseous media from an environment into the electronics housing and in reverse from the electronics housing into the environment; and
    prevent passage of liquid media and/or solids;
  an axial seal circumferentially extending about a rim of the at least one gas passage opening of the base body, wherein the membrane carrier is configured to:
    in the normal operating state, be pressed by an axial force seal-tightly against the axial seal; and
    when a pressure difference between an interior of the electronics housing and an environment is surpassed, lift off the base body, and release at least one emergency degassing opening surrounding the semipermeable membrane and transfer the degassing unit into an emergency degassing state
  a cover hood connected to the base body, wherein the cover hood comprises at least one venting opening; and
  a monitoring device comprising a first contact element arranged at the membrane carrier, and a second contact element arranged at the cover hood, the monitoring device being configured to:
    detect that the degassing unit is in the normal operating state when the first contact element is not in contact with the second contact element; and
    detect that the degassing unit is in the emergency degassing state when the first contact element contacts the second contact element.

20. The motor vehicle according to claim 19, further comprising at least one on-board vehicle control unit,
wherein the electronics housing further comprises an electrical counter transmission element arranged at the at least one housing wall and operatively coupled to a transmission element of the degassing unit, wherein the electrical counter transmission element of the electronics housing is coupled operatively to the at least one on-board vehicle control unit.

21. The motor vehicle according to claim 20, further comprising an on-board issuing device,
wherein the at least one on-board vehicle control unit is configured to issue an error message via the on-board issuing device as a function of a detection value of the monitoring device of the degassing unit, wherein the detection value is received by the electrical counter transmission element.

* * * * *